United States Patent [19]

Jones

[11] Patent Number: 5,572,660

[45] Date of Patent: Nov. 5, 1996

[54] SYSTEM AND METHOD FOR SELECTIVE WRITE-BACK CACHING WITHIN A DISK ARRAY SUBSYSTEM

[75] Inventor: Craig S. Jones, Austin, Tex.

[73] Assignee: Dell USA, L.P., Austin, Tex.

[21] Appl. No.: 557,671

[22] Filed: Nov. 13, 1995

Related U.S. Application Data

[63] Continuation of Ser. No. 144,118, Oct. 27, 1993.

[51] Int. Cl.[6] .................................................... G06F 12/16
[52] U.S. Cl. ........................................................ 395/182.04
[58] Field of Search ............................. 395/182.04, 425;
371/49.1; 364/265, 265.3, 266.3, 738

[56] References Cited

U.S. PATENT DOCUMENTS

| | | | |
|---|---|---|---|
| 5,146,574 | 9/1992 | Gajjar et al. | 395/425 |
| 5,233,616 | 8/1993 | Callander | 371/37.7 |
| 5,249,279 | 9/1993 | Schmenk et al. | 395/425 |
| 5,274,645 | 12/1993 | Idleman et al. | 371/10.1 |
| 5,274,799 | 12/1993 | Brant et al. | 395/575 |
| 5,313,626 | 5/1994 | Jones et al. | 395/575 |
| 5,325,504 | 6/1994 | Tipley et al. | 395/425 |
| 5,341,381 | 8/1994 | Fuller | 371/10.1 |
| 5,349,686 | 9/1994 | Gajjar et al. | 395/800 |
| 5,375,128 | 12/1994 | Menon et al. | 371/40.1 |
| 5,469,555 | 11/1995 | Ghosh et al. | 395/460 |

*Primary Examiner*—Robert W. Beausoliel, Jr.
*Assistant Examiner*—Stephen C. Elmore
*Attorney, Agent, or Firm*—Henry N. Garrana; Michelle M. Turner; Mark P. Kahler

[57] ABSTRACT

A fault tolerant disk array subsystem is provided that includes a plurality of data drives for storing real data and a parity drive for storing redundant data. Each data drive is associated with a dedicated write-through cache unit and the parity drive is associated with a dedicated write-back cache unit. An array scheduler schedules read and write operations to access the data drives and includes a parity control unit for updating parity information when new data is written to one of the data drives. Since a write-back caching technique is used to store updated parity information, the write latency of the parity drive does not limit the write-throughput of the disk array subsystem. Furthermore, since a non-volatile memory unit is provided to store the addresses of any dirty parity information within the write-back cache unit, parity information can be reconstructed in the event of a power failure. The disk array subsystem provides a low cost, mass storage resource having improved write performance characteristics. The disk array subsystem also accommodates data redundancy to allow data restoration in the event of disk failure.

15 Claims, 13 Drawing Sheets

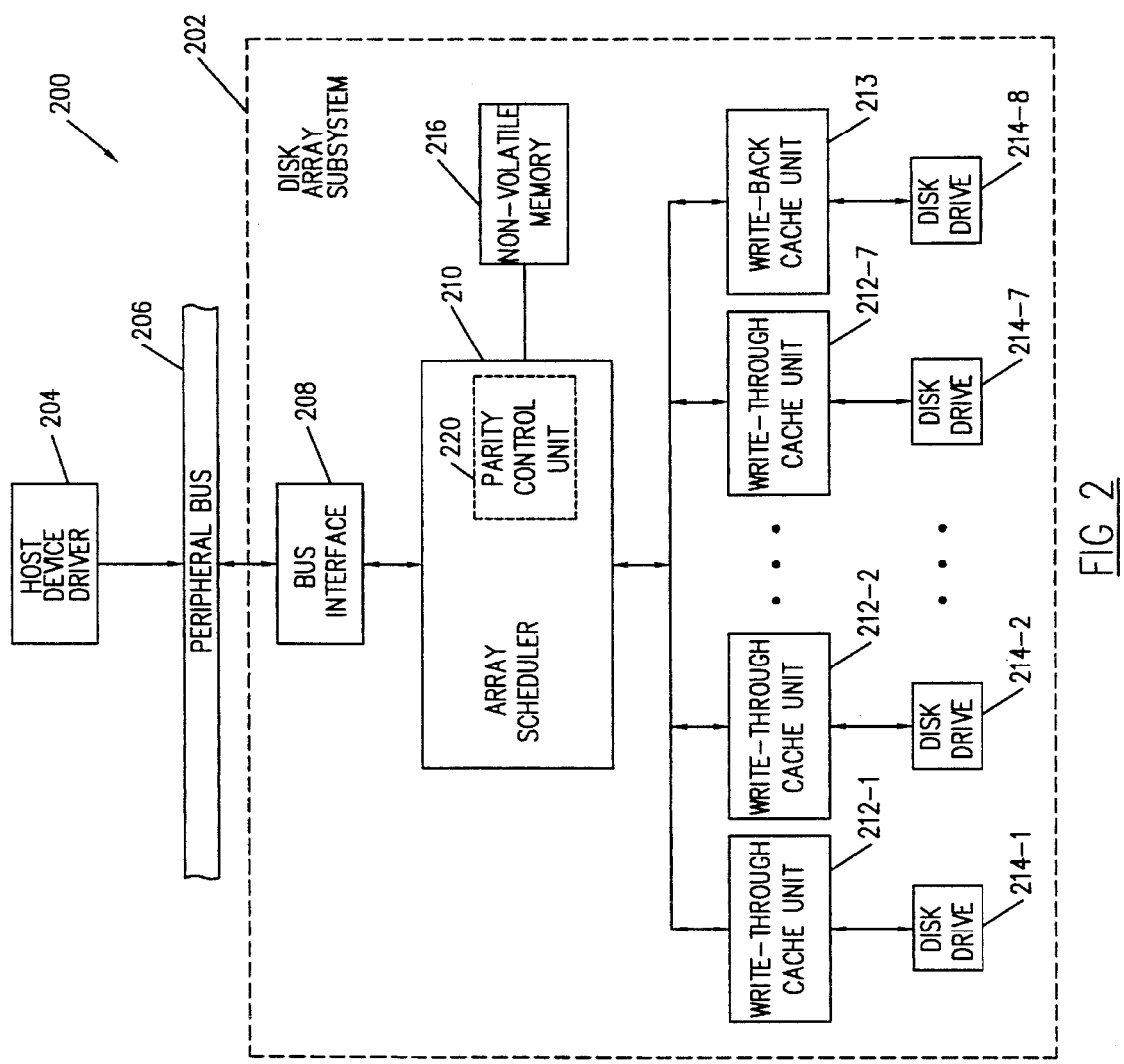

SYSTEM AND METHOD FOR SELECTIVE WRITE-BACK CACHING WITHIN A DISK ARRAY SUBSYSTEM

This is a continuation of application Ser. No. 08/144,118 filed Oct. 27, 1993.

BACKGROUND OF THE INVENTION

1. Field of the Invention

This invention relates to systems and methods for controlling an array of disk drives in a computer system and, more particularly, to a system and method wherein cached data is selectively written-back to a disk drive array.

2. Background of the Relevant Art

In the past several years, a new trend in mass storage subsystems has emerged for improving the performance, capacity, cost, and reliability associated with the storage of data. This trend involves an increase in the use of what are generally referred to as disk array subsystems. A number of reference articles that describe the design and characteristics of disk array subsystems have been published, including the articles: "Introduction to Redundant Arrays of Inexpensive Disks (RAID)" by D. Patterson, P. Chen, G. Gibson and R. Katz, IEEE, 1989; "Coding Techniques for Handling Failures in Large Disk Arrays" by G. Gibson, L. Hellerstein, R. Karp, R. Katz and D. Patterson, Report No. UCB/CSD 88/477, December 1988, Computer Science Division, University of California Berkeley; and "A Case Study for Redundant Arrays of Inexpensive Disks (RAID)" by D. Patterson, G. Gibson, and R. Katz, presented at the June 1988 ACM SIGMOD Conference in Chicago, Ill.

Generally speaking, a disk array subsystem includes an array of standard disk drives, referred to collectively as a "composite" drive, coupled in parallel. The disk array subsystem further includes a drive array controller for interfacing the composite drive to a computer system. The drive array controller, which is generally installable on an expansion bus of the computer system, converts input-output ("I/O") read and write requests into a sequence of seeks, delays and other disk commands to read data from or write data to the composite drive.

A drive array controller differs from a conventional disk drive controller (i.e., a single disk controller) in that, with respect to the drive array controller, the set of disk drives coupled thereto emulate a single disk drive having a greater capacity and a higher performance than any individual disk drive included as a portion thereof. To perform an access to a virtual composite drive location within the composite drive, the drive array controller must be cognizant of both the position of the particular disk drive to be accessed as well as the physical sector location within that disk drive which corresponds to the virtual composite drive location for which access is sought. Various hardware anti software implementations are well-known for performing these functions.

A significant concern relating to the mass storage of data within disk array subsystems is the possibility of data loss or corruption due to drive failure. A variety of data redundancy and recovery techniques have therefore been proposed to allow restoration of data in the event of a drive failure. Exemplary techniques are discussed within, for example, the previously-mentioned articles. One technique commonly referred to as a "level 1 RAID" technique involves the use of a mirrored drive. The level 1 RAID technique in effect provides a redundant data drive for each primary data drive. A write to a disk array utilizing the level 1 RAID technique will result in a write to the, primary data disk and a write to its mirror drive. If a failure in one of the primary data, drives occurs, the system can access the redundant data in the mirror drive until the failed drive is replaced. This technique results in a minimum loss of performance in the disk array. However, a significant disadvantage of the level 1 RAID technique is that 50% of the total data storage space must be allocated for redundancy purposes. Therefore, a relatively high cost of storage per byte results.

Another data redundancy and recovery technique commonly referred to as a "level 4 RAID" technique involves the use of a parity scheme. By calculating and storing the parity of a group of data disks on a per-bit basis, any single disk failure can be corrected simply by reading the rest of the disks in the group to determine what bit value on the failed disk would give the proper parity. As will be considered in further detail below, the parity information is initially obtained by performing a logical exclusive-OR (XOR) operation on each corresponding bit of the data disks. The parity information is then stored within a reserved drive referred to as a "parity drive".

An advantage of the level 4 RAID technique is that the amount of data storage dedicated to data redundancy and recovery is minimized. For example, in an eight drive array, the parity technique requires that only one of the drives be used for parity information; therefore, 12.5% of total storage is dedicated to redundancy as compared to 50% using the mirrored drive technique. As a result, the level 4 RAID technique decreases the cost of data storage in comparison to the level 1 RAID technique while still providing for data recovery.

A disadvantage of the level 4 RAID technique is the loss of write performance within the disk array. Write throughput is limited since the parity drive must be updated each time new data is written to one of the data drives. To update the parity drive, the new data being written must first undergo an exclusive-OR logical operation with the old data that will be overwritten within the data drive. That result must then be exclusive-ORed with the old parity data stored in the corresponding location of the parity drive. This requirement severely degrades write performance.

Another data redundancy and recovery technique referred to as a "level 5 RAID" technique also involves the use of an XOR parity scheme. The level 5 RAID technique is similar to level 4 RAID except that, with respect to level 5 RAID, the data and parity information is distributed per sector across all the disks in the array rather than reserving a dedicated disk solely for parity information. By distributing the data and parity information across all the disks, the write throughput may be somewhat improved since parity data may be updated within different drives simultaneously.

Despite the improved write throughput of level 5 RAID, it continues to be desirable to provide a disk array subsystem having even better write throughput characteristics while maintaining the advantages of data redundancy and low cost.

SUMMARY OF THE INVENTION

The problems outlined above are in large part solved by a system and method for selective write-back caching within a disk array subsystem according to the present invention. In one embodiment, a fault tolerant disk array subsystem implements a level 4 RAID technique and includes a plurality of data drives for storing real data and a parity drive for storing parity information. Each data drive is associated with a dedicated write-through cache unit and the parity drive is associated with a dedicated write-back cache unit. An array scheduler schedules read and write operations to access the data drives and includes a parity control unit for updating parity information when new data is written to one of the data drives. Since a write-back caching technique is used to store updated parity information, the write latency of the parity drive does not limit the write-throughput of the disk array subsystem. Furthermore, since a non-volatile memory unit is provided to store the addresses of any dirty parity information within the write-back cache unit, parity information can be reconstructed in the event of a power failure. The disk array subsystem provides a low cost, mass storage resource having improved write performance characteristics. A fault tolerant disk array subsystem that implements a level 5 RAID technique may also be provided that utilizes a similar write-back caching scheme for storing parity information.

Broadly speaking, the present invention contemplates a disk array subsystem connectable to a peripheral bus of a computer system comprising a plurality of disk drives coupled in parallel. An array scheduler is also provided that is capable of receiving a new write data sector and an associated composite write request signal from the peripheral bus. The array scheduler is also capable of determining a physical location within one the disk drives to which the composite write request signal corresponds, and is capable of generating a disk write request signal that causes the new write data sector to be written into the physical location of the disk drive. A parity control unit is further provided that is capable of reading an old data sector from the physical location within the disk drive before the new write data sector is written into the physical location. The parity control unit is also capable of calculating a sector of new parity information based upon an exclusive-OR relationship of the new write data sector, the old data sector, and a sector of old parity information. A write-back cache unit is coupled to a second disk drive for storing the sector of new parity information.

The present invention further contemplates a disk array controller connectable to a peripheral bus of a computer system and to an array of disk drives. The disk array controller comprises a write-back cache unit connectable to one of the disk drives for storing parity information and a write-through cache unit connectable to at least a second of the disk drives for storing data. The disk array controller further comprises a parity control unit coupled to the write-back cache unit. The parity control unit is capable of calculating updated parity information when a write to the second disk drive occurs. An array scheduler is coupled to the second disk drive and is capable of receiving a write request signal from the peripheral bus and determining a physical location within the array of disk drives to which the write request signal corresponds.

The present invention finally contemplates a method for controlling the transfer and storage of data within a disk array subsystem. The method comprises the steps of storing real data within corresponding sectors of a plurality of disk drives, storing parity data within a corresponding sector of an additional disk drive, and receiving a write request signal to store a new sector of write data within a predetermined location of one the plurality of disk drives. The method comprises the further steps of storing the new sector of write data within a first memory buffer, transferring an old sector of data from the predetermined location of the disk drive to a second memory buffer, and retrieving a corresponding sector of parity information from the additional disk drive. The method finally comprises the steps of calculating an updated sector of parity information, storing the new sector of write data into the predetermined location of the disk drive, and storing the updated sector of parity information into a write-back cache memory.

BRIEF DESCRIPTION OF THE DRAWINGS

Other objects and advantages of the invention will become apparent upon reading the following detailed description and upon reference to the accompanying drawings in which:

FIG. 2 is a functional block diagram of a computer system including a disk array subsystem according to the present invention.

Figure 1:
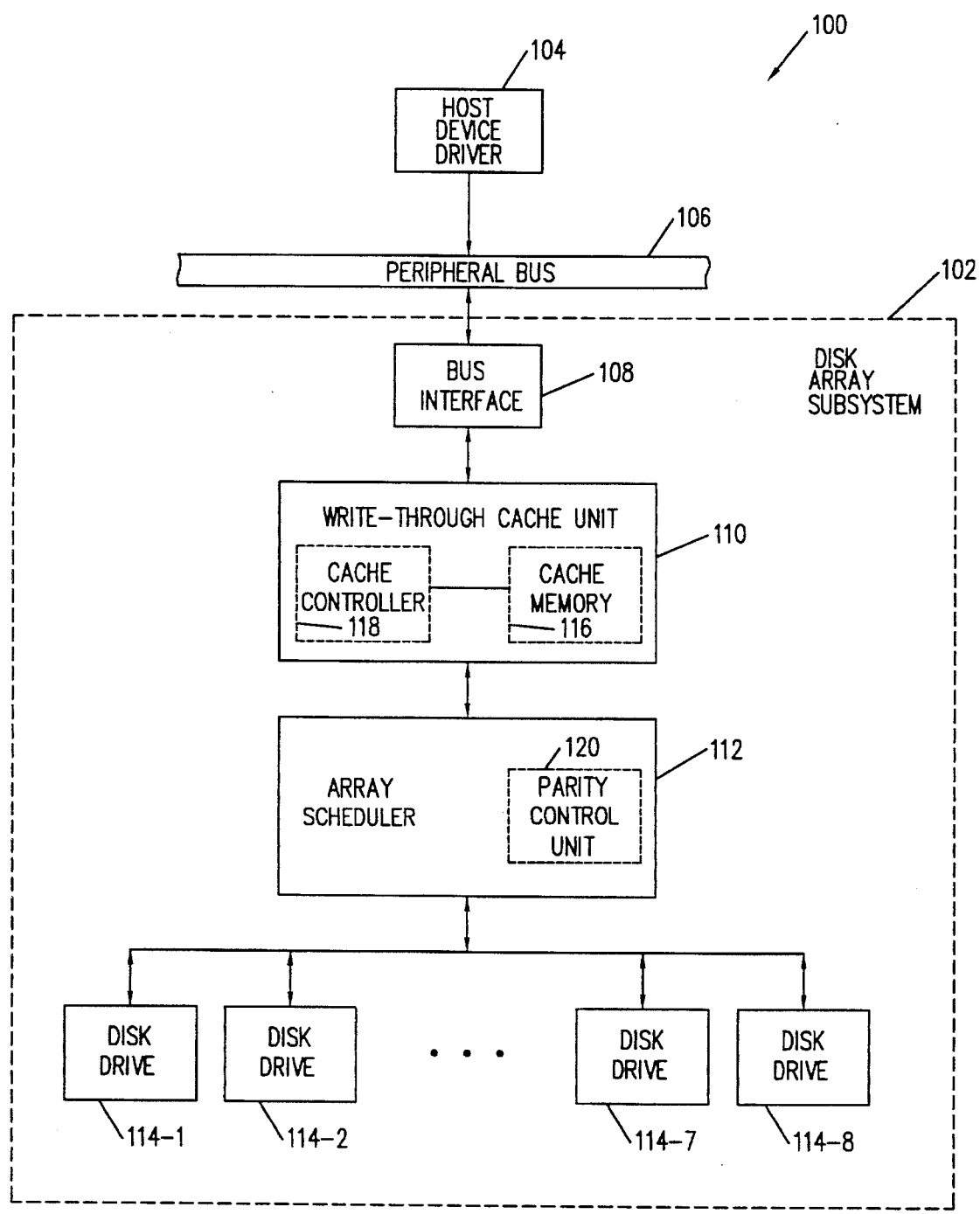
FIG. 1 is a functional block diagram that illustrates a portion of a prior art computer system including a disk array subsystem.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring first to FIG. 1, a functional block diagram is shown of a portion of a prior art computer system 100 including a disk array subsystem 102. A host device driver 104 is coupled to disk array subsystem 102 through a peripheral bus 106. The disk array subsystem 102 includes a peripheral bus interface 108 that orchestrates the transfer of data, address and control signals between peripheral bus 106 and a write-through cache unit 110. An array scheduler 112 is further shown coupled between write-through cache unit 110 and an array of disk drives 114-1 through 114-8.

Host device driver 104 generates various input/output read and write requests that are provided to peripheral bus 106 to selectively access memory locations within the array of disk drives 114-1 through 114-8. The host device driver 104 may be partially embodied by software executed within, for example, a system microprocessor (not shown).

Write-through cache unit 110 is an SRAM (static random access memory) memory unit interposed between peripheral bus interface unit 108 and array scheduler 112. Write-through cache unit 110 is provided to improve the effective memory transfer rates of disk array subsystem 102 during disk read operations. The well-known write-through caching concept anticipates the likely reuse by the host device driver 104 of selected data in disk array subsystem 102 by storing a copy of the selected data in the write-through cache unit 110.

Write-through cache unit 110 includes a cache memory 116 having a plurality of memory sections, wherein each section typically stores one or more sectors of data corresponding to selected sectors within the array of disk drives 114-1 through 114-8. Each memory section of cache memory 116 has associated with it an address tag that uniquely identifies which sector from the array of disk drives 114-1 through 114-8 it corresponds to. If during operation a request originates in host device driver 104 to retrieve a sector of disk information, an address tag comparison is made by a cache controller 118 to determine whether a copy of the requested sector resides in a section of the cache memory 110. If present, the sector of data is provided to peripheral bus 1 directly from the write-through cache unit 110. This event is referred to as a cache "hit". If not present, the requested sector of data is read from one of the disk drives 114-1 through 114-8 via array scheduler 112 and is provided to peripheral bus 106. This event is referred to as a cache "miss". The requested sector may simultaneously be stored within an allocated memory section of write-through cache unit 110. This event is referred to as a cache "miss".

Since the cache memory 116 of write-through cache unit 110 is of limited size, space must often be allocated within the cache to accommodate a new sector of data. An algorithm based on history of use is typically implemented by cache controller 118 to identify the least necessary sector to be overwritten by the new sector.

Write requests are handled differently by write-through cache unit 110. When a write request originates in host device driver 104, the request is passed directly to array scheduler 112 and the data is written directly into one of the disk drives 114-1 through 114-8. Depending upon the particular operation of cache controller 118, the write data may simultaneously be stored within cache memory 116.

As a result of implementing a write-through caching technique, all data written from host device driver 104 is written directly into one of the disk drives 114-1 through 114-8. Accordingly, the most up-to-date data is assured to be stored within the non-volatile disk memory when the system performs a disk write operation, and "dirty data" will never reside within cache memory 116. Accordingly, even if a power failure occurs, data will not be lost. The write-through caching technique described above is contrasted with a write-back caching technique in which, if implemented, data written from host device driver 102 is stored within cache memory 116 if a cache hit occurs. The data is marked as "dirty" by cache controller 118 and is not written back to disk storage until a later time as determined by a replacement algorithm implemented by cache controller 118. In many applications and particularly those involving large data-bases, the write-back caching technique is unacceptable since dirty data within the cache memory would be irretrievably lost if a power failure were to occur.

Array scheduler 112 receives a read or write request if the write-through cache unit 110 cannot directly service the particular request. When array scheduler 112 receives a request, it determines the specific disk and sector location to which access is sought and generates the necessary sequence of seeks, delays, or other disk data transfer commands to effectuate the requested read or write of data.

Array scheduler 112 additionally includes a parity control unit 120 illustrated in phantom that controls the generation of exclusive-OR parity information. Parity control unit 120 may implement, for example, either a level 4 or a level 5 RAID data redundancy technique to thereby allow data restoration in the event of disk failure.

Although the disk array subsystem 102 allows for the restoration of data in the event that one of the disk drives 114-1 through 114-8 fails, the write throughput of the disk array subsystem 102 is severely limited. This limitation occurs since, before new data can be written to a sector location within one of the data drives, the old data stored at that sector location must first be read by parity control unit 120 from the data drive and exclusive-ORed with the new data. The resulting value of that exclusive-OR operation must then be exclusive-ORed with the old parity data residing in the corresponding sector location of the corresponding parity drive. The final result must then be written into the corresponding parity drive. The time required to store the updated parity information within the parity drive decreases the write-throughput of the disk array subsystem 106.

Referring next to FIG. 2, a functional block diagram is shown that illustrates a portion of a computer system 200 including a disk array subsystem 202 according to the present invention. The disk array subsystem 202 is coupled to a host device driver 204 via a peripheral bus 206.

Disk array subsystem 202 includes an array scheduler 210 coupled to peripheral bus 206 through a peripheral bus interface 208. A plurality of write-through cache units 212-1 through 212-7 and a write-back cache unit 213 are further shown coupled in parallel between array scheduler 210 and an array of disk drives 214-1 through 214-8. A non-volatile memory unit 216 is finally shown coupled to array scheduler 210.

Peripheral bus 206 has a predetermined bit width and is capable of transferring data, address, and control signals associated with disk access cycles. Exemplary peripheral bus standard configurations that may be implemented by peripheral bus 206 include the ISA (Industry Standard Architecture) configuration, the EISA (Extended Industry Standard Architecture) configuration, and the PCI bus configuration.

Host device driver 204 is similar to the corresponding host device driver of FIG. 1. Host device driver 204 generates various input/output read and write requests that are provided to peripheral bus 206 to selectively access virtually-addressed memory locations within the array of disk drives 114-1 through 114-8. The host device driver 204 may be partially embodied by software incorporated as a portion of the operating system of the computer system. For such an implementation, a system microprocessor may be used to execute the software code that embodies host device driver 204. It is noted that the system microprocessor could be physically coupled to peripheral bus 206 through an appropriate bus interface unit. It is further noted that a variety of implementations of exemplary host device drivers are well known.

Array scheduler 210 receives the read and write requests from peripheral bus 206 through peripheral bus interface 208 and determines the specific disk drive 214-x for which access is sought. As will be explained in greater detail below, array scheduler 210 subsequently provides appropriate control signals to the cache units 212-1 through 212-7 and to disk drives 214-1 through 214-7 to effectuate the requested data transfer.

Array scheduler 210 further includes a parity control unit 220 illustrated in phantom. In this embodiment, parity control unit 220 is a data redundancy unit that implements a level 4 RAID technique to generate exclusive-OR parity information indicative of the data stored within disk drives 214-1 through 214-7. Parity control unit 20 causes the parity information to be stored within write-back cache unit 213 and within disk drive 214-8. As discussed herein, disk drives 214-1 through 214-7 are referred to as "data drives" and disk drive 214-8 is referred to as a "parity drive". Further details regarding the operation of parity control unit 220 will be more fully considered. below.

Each write-through cache unit 212-1 through 212-7 includes an SRAM cache memory and an associated cache controller (not shown in FIG. 2). The write-through cache units 212-x are provided to improve the effective memory transfer rates of disk array subsystem 202 during disk read operations. If a read request is provided to one of the write-through cache units 212-x from array scheduler 210 to cause a sector of disk information to be retrieved, an address tag comparison is made within the respective cache controller to determine whether a copy of the requested sector resides therein. If present, the sector of data is provided directly from the write-through cache unit 212-x. If not present, the requested sector of data is read from the corresponding disk drive 214-x. The requested sector may simultaneously be stored within an allocated memory section of the write-through cache unit 212-x.

Figure 2A:
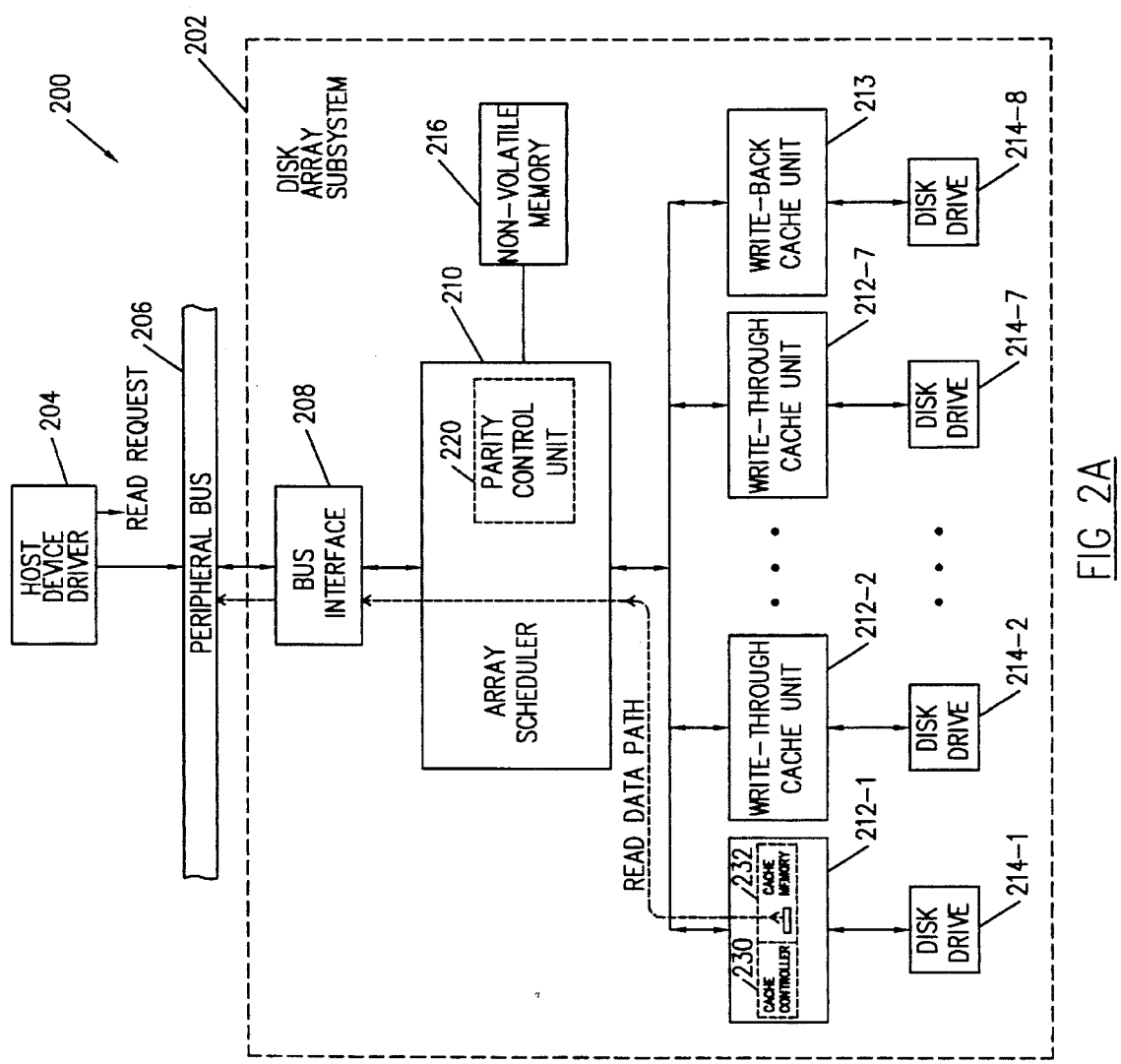
FIG. 2A is a functional block diagram of the computer system of FIG. 2 that illustrates the flow of data and control signals associated with a read request when a cache hit occurs.

FIG. 2A illustrates the flow of data and control signals associated with a read request when a cache hit occurs. A read request signal including a composite drive virtual address originates in host device driver 204 and is received by array scheduler 210 through peripheral bus interface 208. The array scheduler 210 accordingly determines the particular disk drive 214-x that contains the requested sector of data. If, illustratively, the read request corresponds to a physical sector of data stored within disk drive 214-1, array scheduler 210 provides a read request signal including the physical sector location write-through cache unit 212-1. A cache controller 230 (shown in phantom) within write-through cache unit 212-1 accordingly determines whether a cache hit has occurred. This is achieved by performing an address tag comparison for each of the sectors of data stored within an associated cache memory 232 (also shown in phantom). If the requested sector of data resides within a section 231 of cache memory 232, a cache hit has occurred and the sector of data is provided to peripheral bus 206 directly from cache memory 232.

Figure 2B:
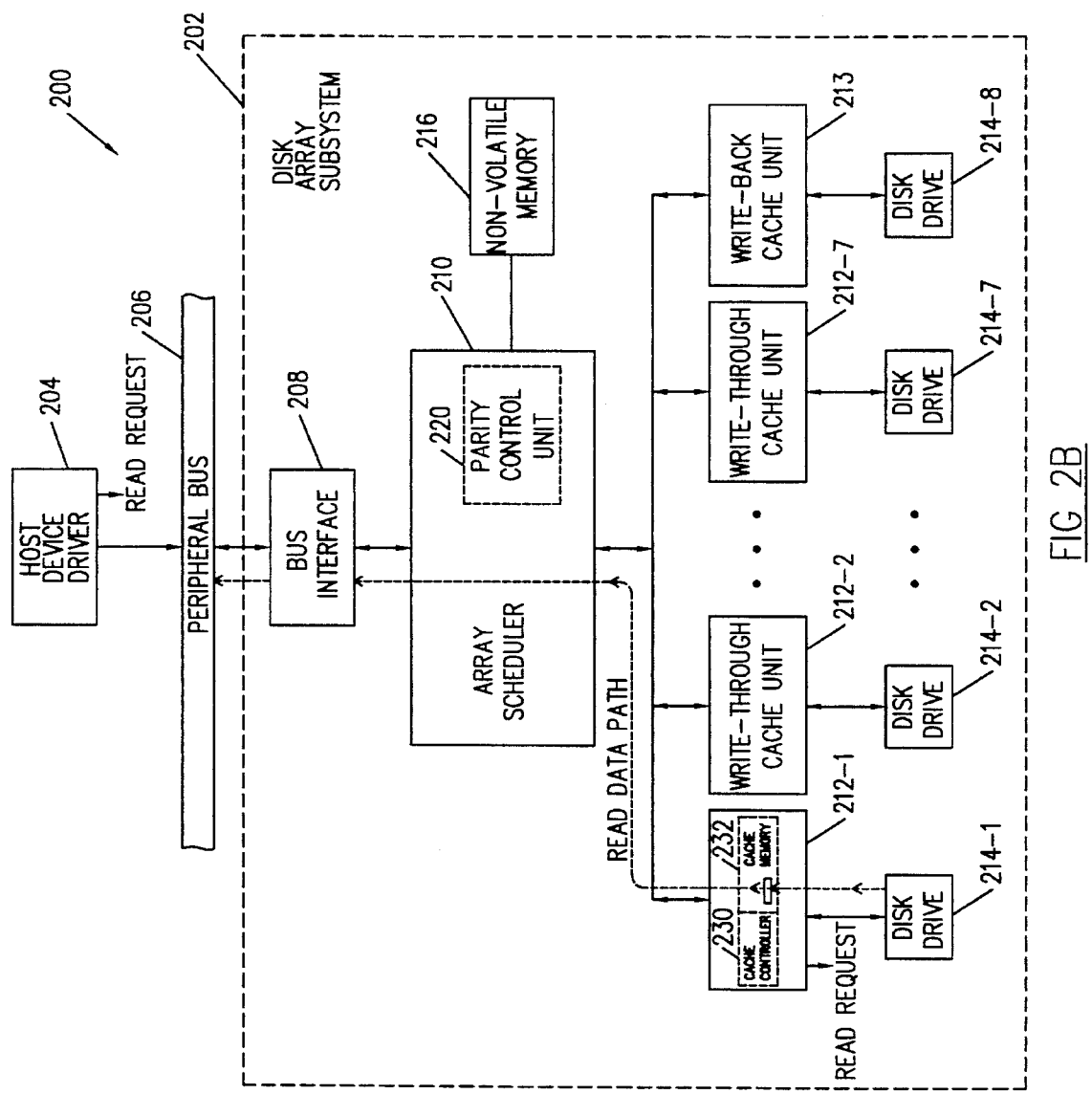
FIG. 2B is a functional block diagram of the computer system of FIG. 2 that illustrates the flow of data and control signals associated with a read request when a cache miss occurs.

FIG. 2B illustrates the flow of data and control signals for a read request when a cache miss occurs. As illustrated in FIG. 2B, when a read request originates in host device driver 204, array scheduler 210 again determines the particular disk drive 214-x that contains the requested sector of data. If, illustratively, the data resides within disk drive 214-1, array scheduler 210 again provides an appropriate read request signal including the physical sector location to write-through cache unit 212-1. If cache controller 230 determines that the requested sector of data is not stored within the associated cache memory 232, a cache miss has occurred and a disk read operation is initiated to retrieve the requested sector of data from disk drive 214-1. It is noted that the disk read request that causes the data to be retrieved from disk drive 214-1 may be generated by either cache controller 230 or by array scheduler 210. Once the sector of data has been read from disk drive 214-1, the sector is provided to peripheral bus 206. The sector of data may be simultaneously stored within an allocated memory section 231 of cache memory 232.

The operation and flow of data within disk array subsystem 202 for disk write requests will next be considered. As stated previously, disk drive 214-8 is reserved as a parity drive for storing parity information. This parity information is initially derived by parity control unit 220 using data stored within disk drives 214-1 through 214-7. Specifically, the data stored within corresponding sections of disk drives 214-1 through 214-7 is exclusive-ORed on a per-bit basis to obtain the parity data that is stored within a corresponding section of disk drive 214-8. This technique is taught generally within the article "Introduction to Redundant Arrays of Inexpensive Disks (RAID)" by Patterson et al.; IEEE; 1989.

Once the parity information has been stored within parity drive 214-8, the parity information must be updated whenever a write to one of the disk drives 214-1 through 214-7 occurs. The details of this operation are described next.

Figure 2C:
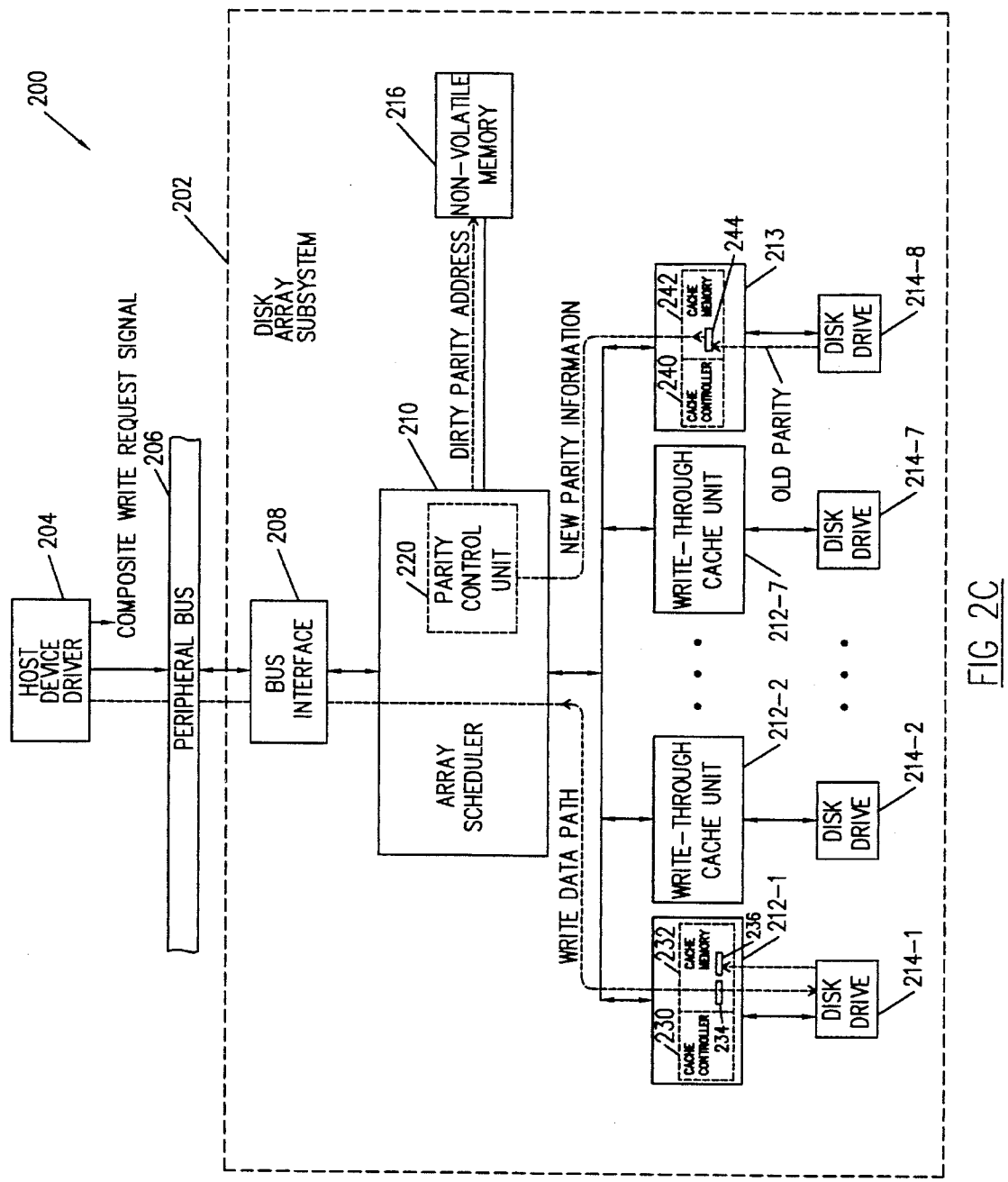
FIG. 2C is a functional block diagram of the computer system of FIG. 2 that illustrates the flow of data and control signals associated with a write request.

FIG. 2C illustrates the flow of data and control signals when a write request signal is received from host device driver 204 by disk array subsystem 202. The write, request signal is received by array scheduler 210 through bus interface unit 208. Array scheduler 210 accordingly determines the particular disk drive 214-1 through 214-7 that contains the physical sector corresponding to the virtual composite drive location indicated by the write request. If, illustratively, the physical sector is contained by disk drive 214-1, array scheduler 210 provides a write request signal along with the physical sector address to write-through cache unit 212-1. Cache controller 230 responsively allocates a memory section within cache memory 232 referred to as "write data buffer" 234. The sector of "new write data" is then transferred from peripheral bus 206 into write data buffer 234. Simultaneously, an address tag comparison is performed by cache controller 230 to determine whether the "old data" that will be overwritten by the sector of new data is currently stored within cache memory 232. If the old sector of data is not contained within cache memory 232, the cache control unit 230 generates a disk read request signal to read the old data from disk drive 214-1. Once the disk drive 214-1 has accessed the sector of old data, the old data is stored within a second allocated memory section of cache memory 232 referred to as "old data buffer" 236. It is noted that if the old sector of data was already contained within cache memory 232, cache controller 230 will simply identify the address tag associated with that sector as the old data buffer 236.

As the old data is read from disk drive 214-1, a cache controller 240 (shown in phantom) within write-back cache unit 213 makes a similar address tag comparison to determine whether the parity information that corresponds to the sector being written resides in an associated cache memory 242 (also shown in phantom) of write-back cache unit 213. If the parity information is not already contained within cache memory 242, the cache controller 240 generates a disk read request signal to retrieve the sector of parity information from the parity drive 214-8. Once the parity drive 214-8 has accessed the parity information, it is stored within an allocated memory section of cache memory 242 referred to as "parity buffer" 244. If, on the other hand, the parity information is already contained within cache memory 242, cache controller 240 will simply identify the address tag associated with that sector of parity information as the parity buffer 244.

After the sector of new write data has been stored within write data buffer 234, the sector of old data has been stored within old data buffer 236, and the corresponding sector of parity information has been stored within parity buffer 244, parity control unit 220 performs a logical exclusive-OR operation on a per-bit basis to obtain a sector of new parity information according to the following formula:

new parity=(old data XOR new write data) XOR old parity data

The result thus represents the new parity information. This sector of new parity information is consequently written into cache memory 242 of write-back cache unit 213 and overwrites the sector of old parity information.

Once the new parity information has been calculated, the sector of new write data is transferred from buffer 234 to the requested location within disk drive 214-1. Upon successful storage within disk drive 214-1, the old data residing within the old data buffer 236 is flushed and the tag pointers of cache controller 230 are updated to associate the new data stored within write data buffer 234 with the sector within disk drive 214-1 that was written.

It is noted from the above that although the new write data is written into disk drive 214-1, the new parity information is stored only within the cache memory 242 of write-back cache unit 213 and is not written immediately into disk drive 214-8. Instead, the sector of new parity information stored within cache memory 242 is marked "dirty" by setting an associated dirty bit. The sector address of this dirty parity information is simultaneously stored within non-volatile memory unit 216. The reason for storing within non-volatile memory unit 216 the sector address of dirty parity information will evident from the following.

If one of the data drives 214-1 through 214-7 of disk array subsystem 202 fails the respective data can be reconstructed by writing back any dirty information within write-back cache unit 213 to disk drive 214-8. Subsequently, an exclusive-OR operation may be performed upon each corresponding sector of the remaining data drives and the parity drive on a per-bit basis to reconstruct the data stored by the failed drive.

Likewise, if a power failure occurs, the dirty parity information within write-back cache unit 213 may be lost. However, since the sector addresses of any dirty parity information stored within cache memory 242 were previously stored within non-volatile memory unit 216 according to the foregoing, parity control unit 220 can reconstruct the lost parity information by performing an exclusive-OR operation on corresponding sectors of disk drives 214-1 through 214-7 for each of the sector addresses that were marked dirty and stored within non-volatile memory unit 216. The reconstructed parity information can then be updated within the appropriate sectors of disk drive 214-8.

It is further noted that since a write-back cache unit 213 is used to cache the new parity information, the write latency of disk drive 214-8 does not limit the write-throughput of disk array subsystem 202. This is contrasted with conventional level 4 and level 5 RAID implementations in which the write latency of the parity drive (or drives) limits write-throughput. Thus, overall system performance is improved.

Accordingly, disk array subsystem 202 provides a low-cost mass storage resource having improved write performance characteristics. Disk array subsystem 202 further accommodates data redundancy to allow data restoration in the event of disk failure and prevents data loss in the event of power failure.

Figure 2D:
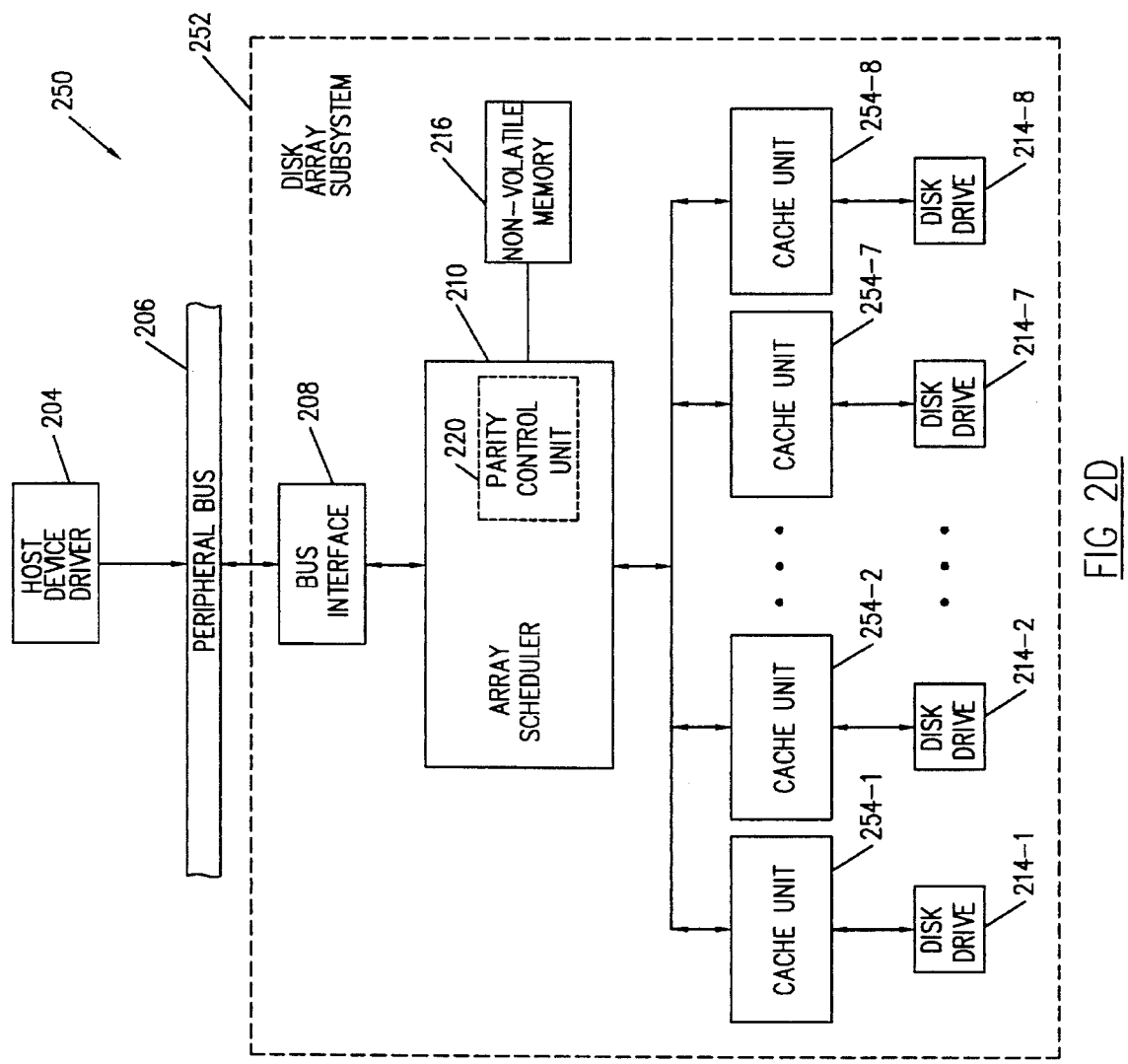
FIG. 2D is a functional block diagram of the computer system of FIG. 2 of a computer system including a level 5 RAID disk array subsystem in accordance with another embodiment of the present invention.

It is noted that the selective write-back caching scheme according to the present invention may be similarly employed within a disk array subsystem that implements a level 5 RAID technique. FIG. 2D is a functional block diagram of a computer system 250 including a disk array subsystem 252 which implements the level 5 RAID approach. Circuit blocks that correspond to those of FIG. 2 are numbered identically.

The embodiment of FIG. 2D is similar to that of FIG. 2 with the exception that the parity information is stored and distributed among the plurality of disk drives 214-1 through 214-8 according to a level 5 RAID approach. As such, a plurality of cache units 254-1 through 254-8 are coupled between array scheduler 210 and disk drives 214-1 through 214-8. The cache units 254-1 through 254-8 are partitioned and configured such that a write-through caching scheme is carried out when array scheduler 210 writes real data to a selected disk drive and such that a write-back caching scheme is carried out when array schduler 210 writes parity information to a selected disk drive.

The functional blocks of FIGS. 2 and 2D as depicted by array scheduler 210, parity control unit 220, and cache units 212-x, 213, and 254-x may be partially implemented by software that is executed on a dedicated processor of disk array subsystem 202. FIGS. 3A–3F illustrate a flow diagram that exemplifies the general operation of one embodiment of such a software routine that implements certain aspects of array scheduler 210, parity control unit 220, and cache units 212-x and 213 during read and write operations.

Figure 3A:
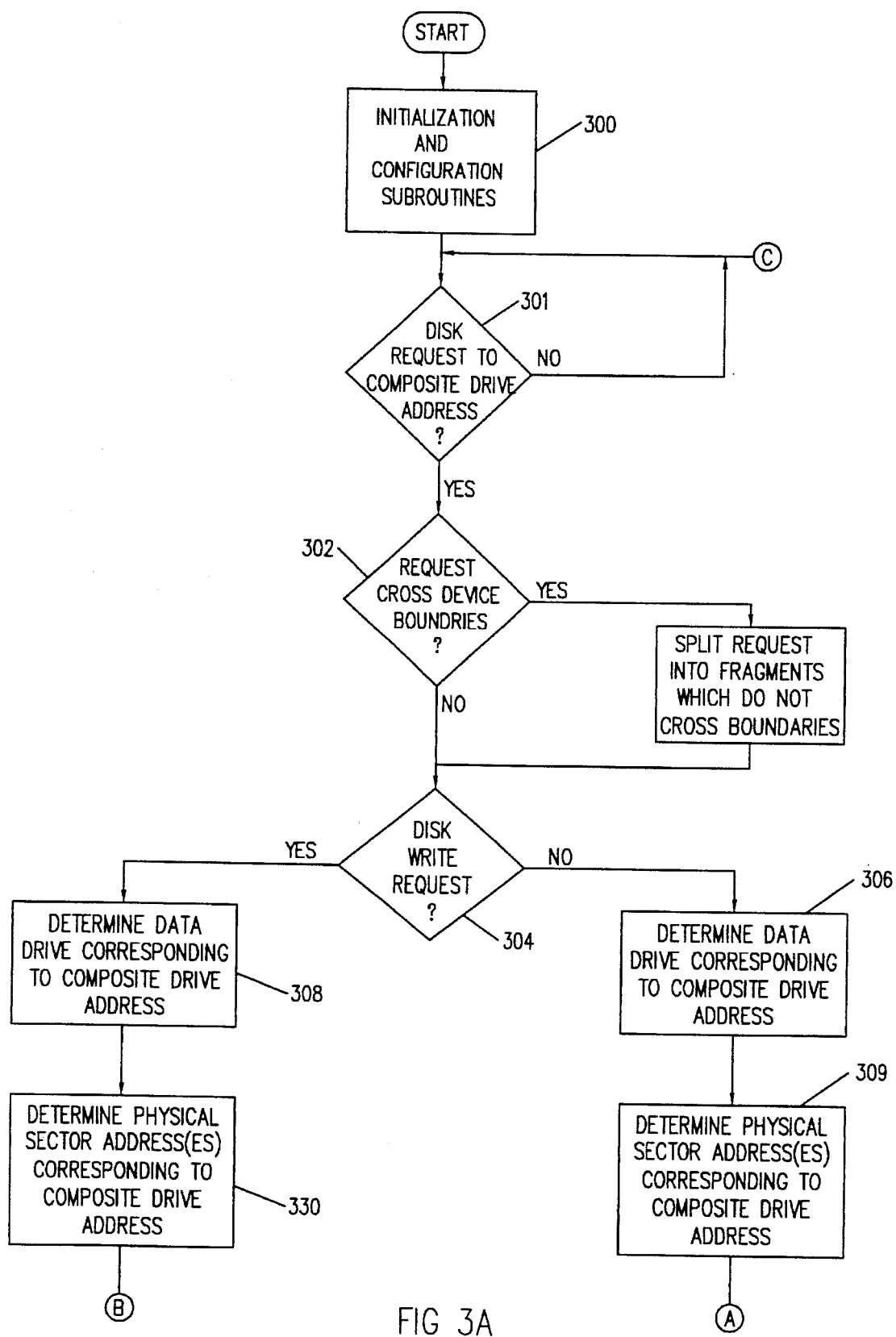
FIG. 3A–3F are flow diagrams that depict a software routine that implements portions of a disk array subsystem according to the present invention.

Referring first to FIG. 3A in conjunction with FIGS. 2A–2C, appropriate initialization and configuration subroutines are executed during step 300 to set the various operational parameters of disk array subsystem 202. For example, the memory capacity and partitioning of each cache unit 212-x and 213 may be selected in accordance with one configuration subroutine of step 300. Similarly, the virtually mapped composite drive address space of disk array subsystem 202 as well as the allocated physical address mapping of disk drives 214-x may be selected within another configuration subroutine of step 300.

Following initialization and configuration, the software flow diagram determines whether a disk read or write request to a composite drive address has been issued on peripheral bus 206 (step 301), and determines whether the request crosses the boundaries of any of the disk drives (step 302). If the request crosses a device boundary, the request is split into fragmented requests which do not cross boundaries (step 303). Subsequently, if a read request is received as determined by step 304, a step 306 is entered which initiates the operations that effectuate the requested read cycle. If, on the other hand, a write request is received, step 308 is entered which initiates the operations that effectuate the requested write cycle.

Figure 3B:
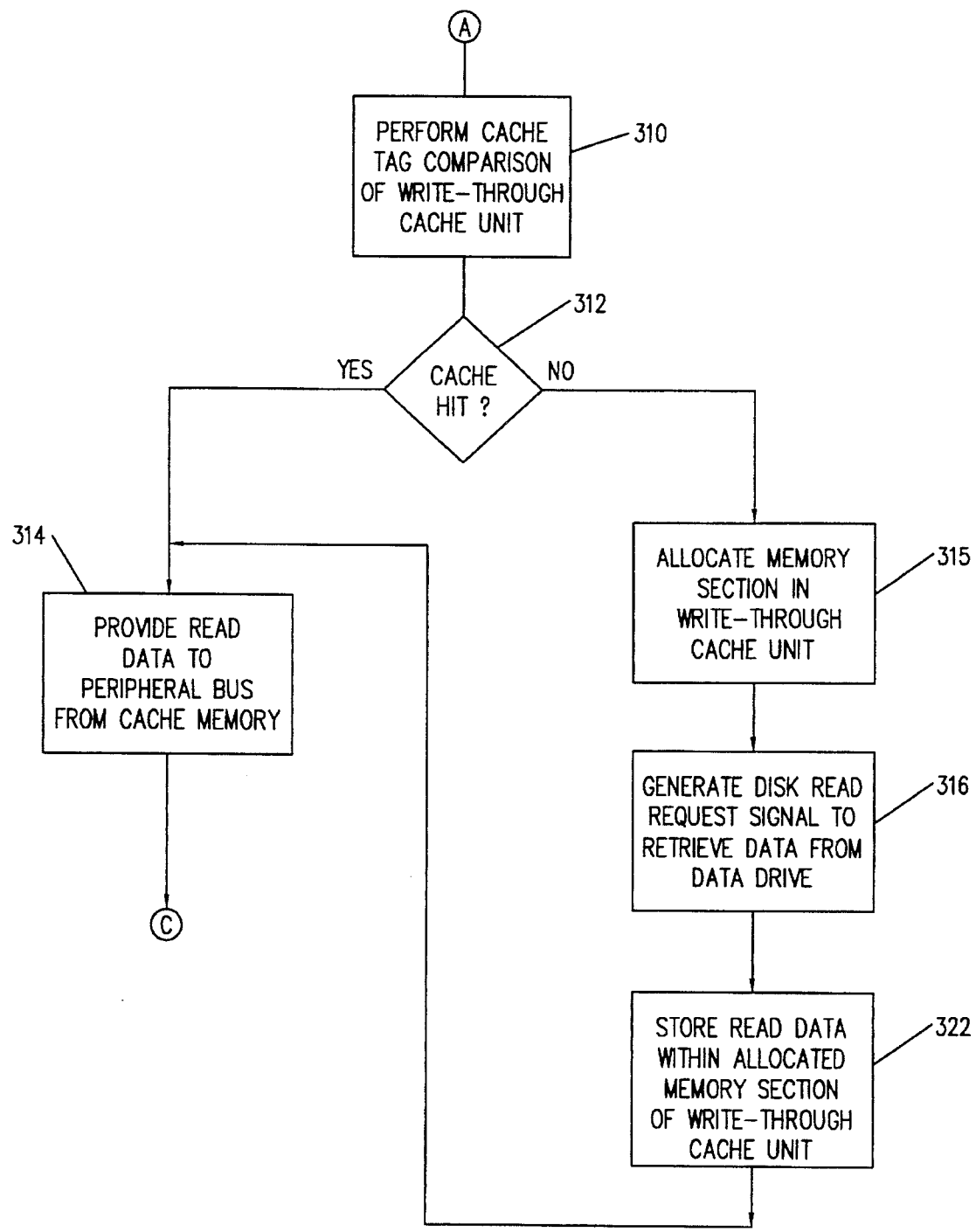

The steps for a read operation are first considered. During step 306, the data drive 214-x that stores the sector (or sectors) of data corresponding to the virtual composite drive address is determined. Similarly, during step 309 the physical sector address within that drive corresponding to the virtual composite drive address is also determined. As illustrated in FIG. 3B, a cache tag comparison is next performed during step 310 within the corresponding write-through cache unit 212-x. If a cache hit occurs as determined during step 312, the requested read data is provided directly to peripheral bus 206 from the cache memory of the write-through cache unit (step 314). If a cache miss occurs, a memory section within the write-through cache unit is allocated during step 315, and a disk read request signal is generated during step 316 and is provided to the appropriate data drive to retrieve the sector (or sectors) of requested data from the data drive. The read data is then stored within the allocated memory section of the write-through cache unit (step 322) and the software flow reverts back to step 314 during which the rquested read data is provided to peripheral bus 206.

The flow diagram is next considered for a write request. Referring back to FIG. 3A, when a write request is received, the data drive that contains the sector corresponding to the virtual composite drive address is determined during state 308. Similarly, during step 330 the physical sector of that data drive which corresponds to the virtual composite drive address is determined.

Figure 3C:
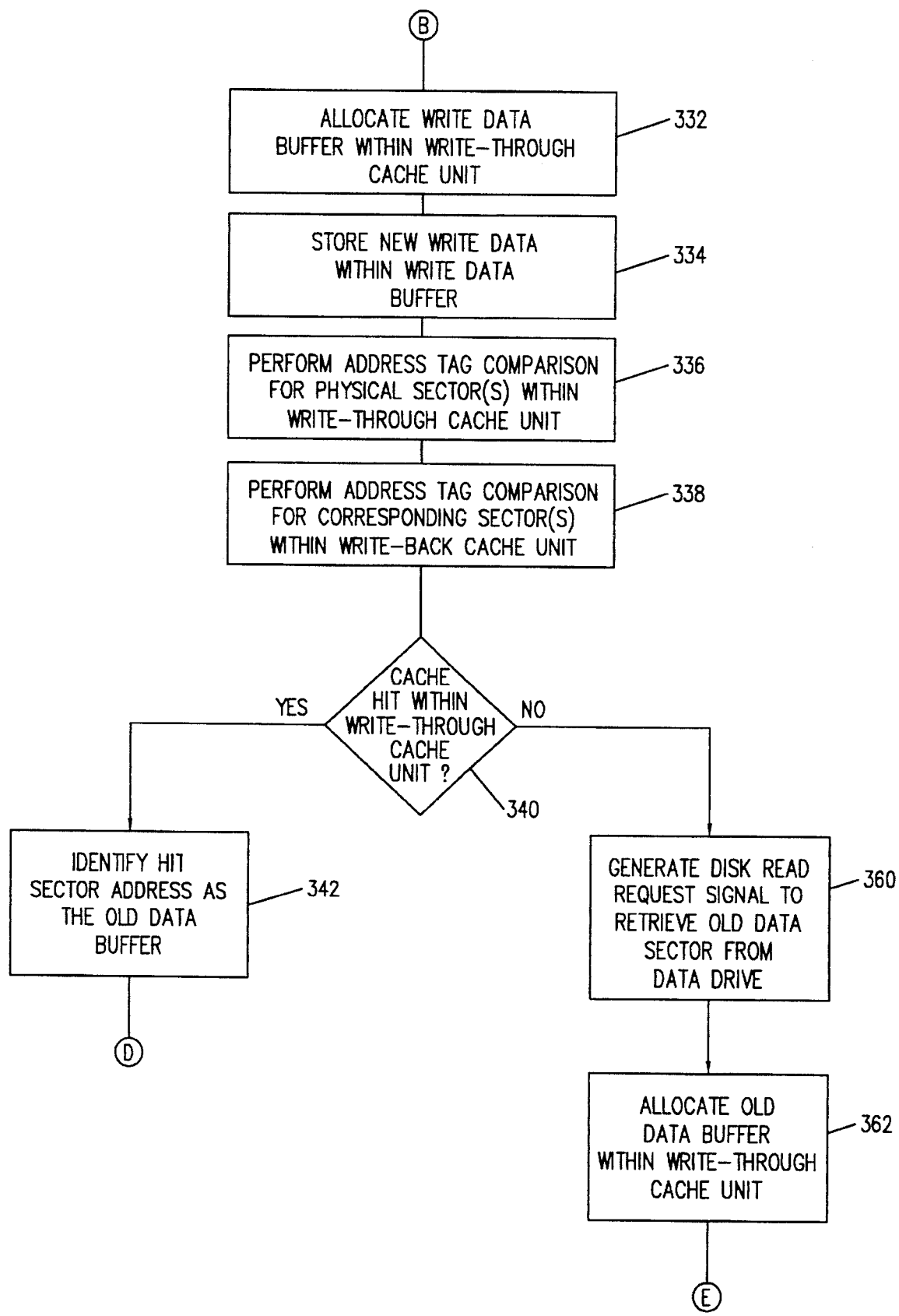
Figure 3D:
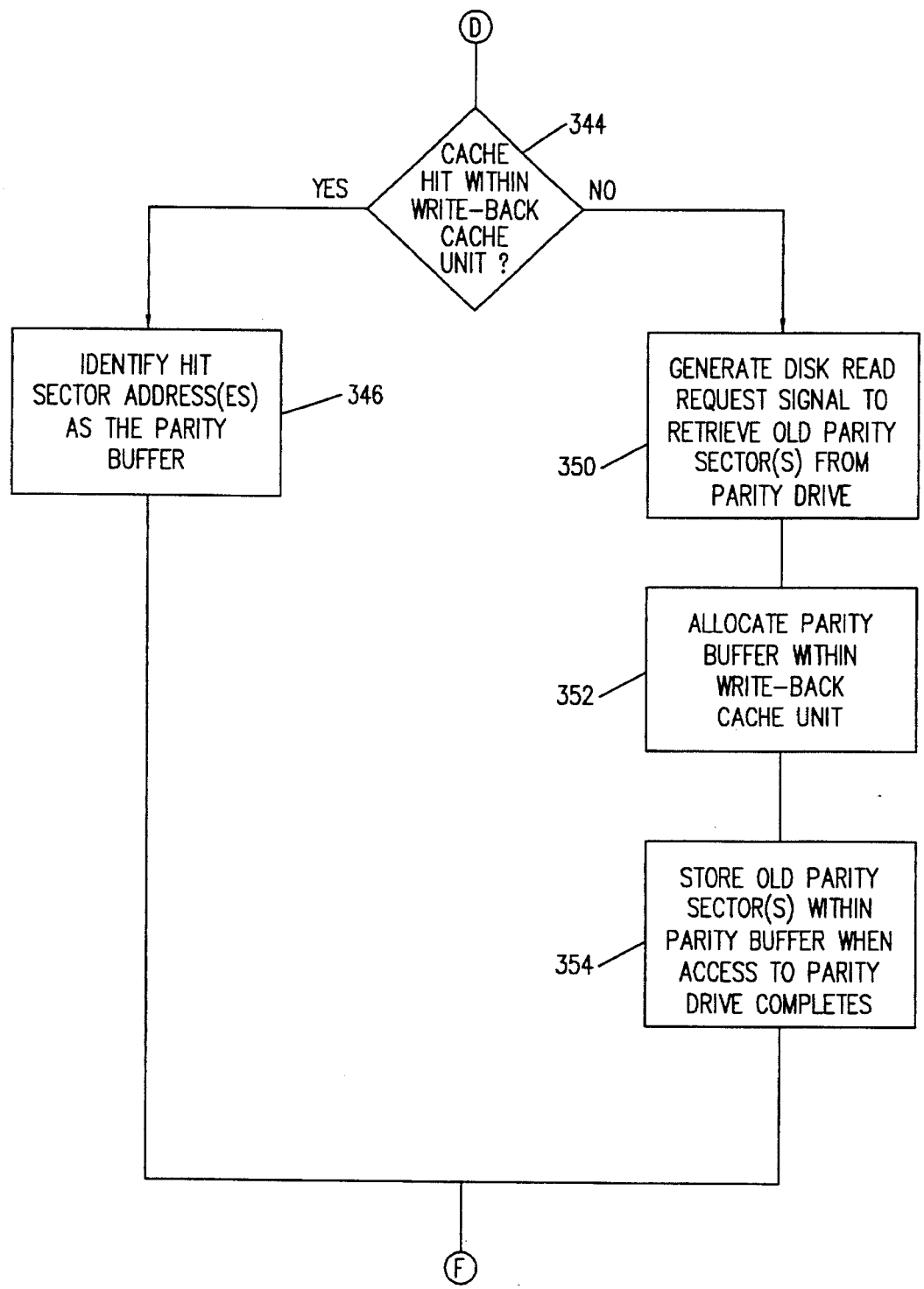
Figure 3E:
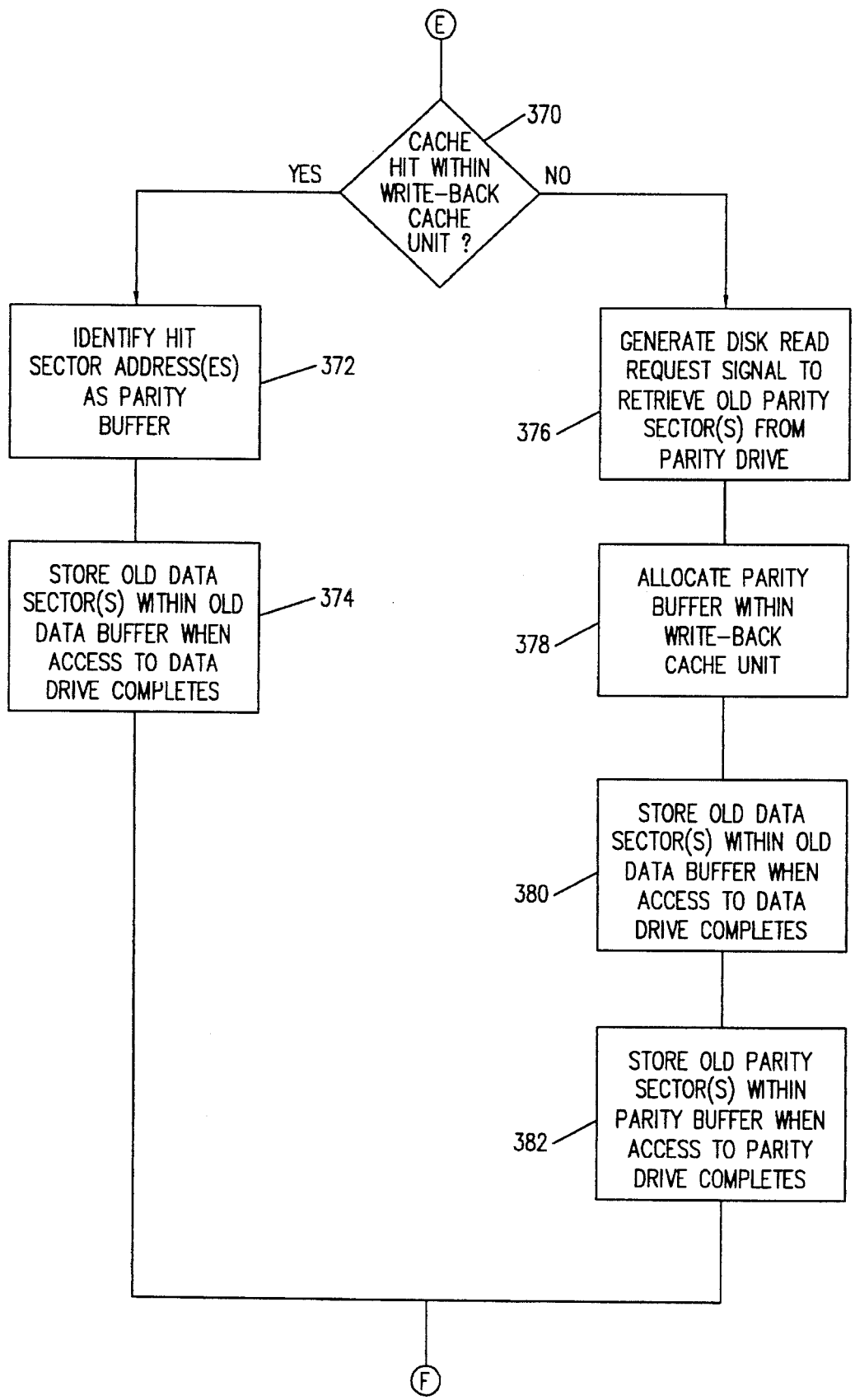

As depicted next within FIGS. 3C-3E, the sector of new write data must be, stored within write data buffer 234, the sector of old data being overwritten must be stored within old data buffer 236, and the corresponding sector of old parity information must be stored within parity buffer 244. Accordingly, address tag comparison operations are performed within the appropriate write-through cache unit 212-x and within write-back cache unit 213. The subsequent steps that occur depend upon whether a cache hit to either or both of the cache units 212-x and 213 occurs.

Referring to FIG. 3C, the write data buffer 234 within the appropriate write-through cache unit 212-x is first allocated during step 332 and the new write data is stored within the allocated write buffer 234 during step 334. During step 336, a write tag comparison is performed within the write-through cache unit to determine whether the physical sector to be written resides therein. A similar cache tag comparison is performed during step 338 within write-back cache unit 213 to determine whether the corresponding parity sector resides therein.

If a cache hit within the write-through cache unit 212-x occurs (step 340), the address of the hit sector is tagged to identify it as the old data buffer 234 during step 342. Referring to FIG. 3D, if a similar cache hit occurs within the write-back cache unit 213 as determined by step 344, the address of the hit sector of write-back cache unit 213 is tagged to identify it as the parity buffer 244. If a cache miss within the write-back cache unit instead occurs, a disk read signal is generated to retrieve the parity sector from the parity drive during step 350. During step 352, a memory location within the write-back cache unit 213 is allocated as the parity buffer 244. When the read operation to the parity drive is complete, the old parity data is stored within parity buffer 244 during step 254.

Referring back to FIG. 3C, if a cache miss within the write-through cache unit 212-x occurs, a disk read signal is generated to retrieve the sector of old data from the corresponding data drive 214-x during step 360. During step 362, a memory section within the write-through cache unit is allocated as the old data buffer 236. Referring to FIG. 2E, if a hit occurs within write-back cache unit 213 as determined by step 370, the address of the hit sector of write-back cache unit 213 is tagged to identify it as the parity buffer 244. As soon as the sector of old data read from the appropriate data drive 212-x (as a result of the request signal generated during step 360) is available, the sector of old data is stored within old data buffer 236 during step 374. If, on the other hand, a cache miss occurs within the write-back cache unit 213 during step 370, a disk read signal is generated to retrieve the sector of old parity information from the parity drive during step 376. A memory location within the write-back cache unit 213 is further allocated as the parity buffer 244 during step 378. When the sector of old data read from data drive 214-x is available (as a result of the read request of step 360), it is stored within old data buffer 236 during step 380. Additionally, as soon as the sector of old parity information has been read from the parity drive 214-8 (as a result of the read request signal generated during step 376), the sector of old parity information is stored within parity buffer 244 (step 382).

Figure 3F:
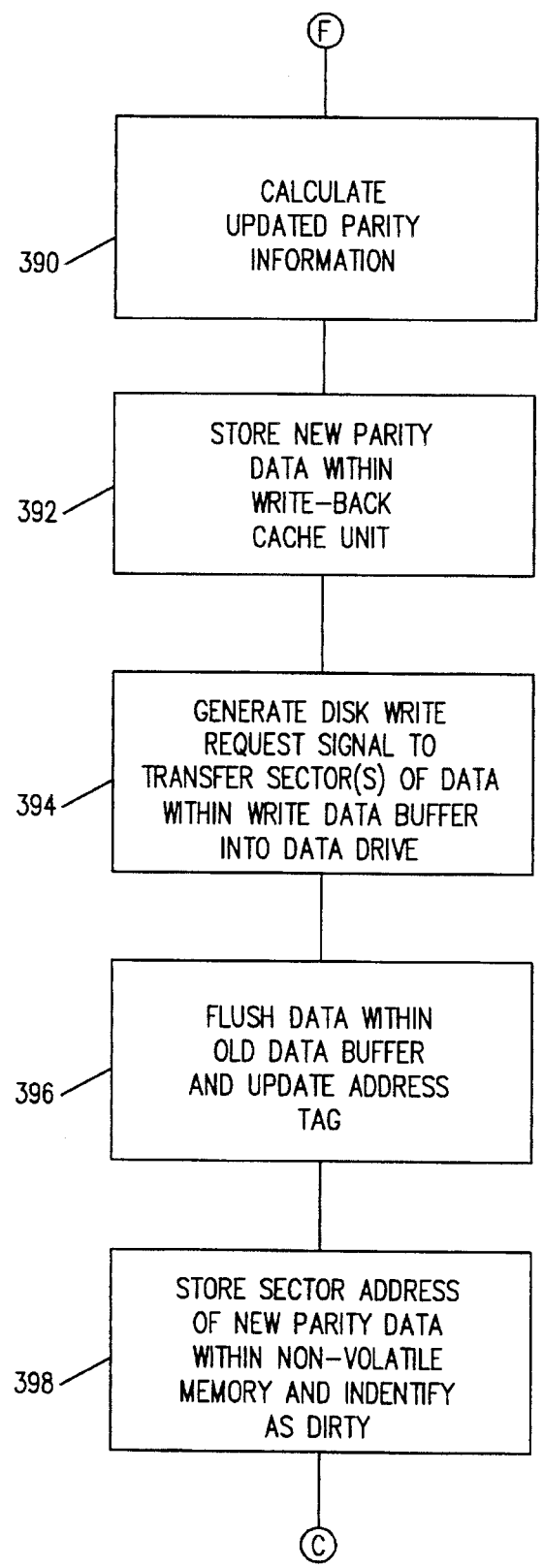

Referring now to FIG. 3F, when the sector of old data and the sector of "old" parity information are stored within the old data buffer 236 and the parity buffer 244 respectively, the calculation of updated parity information can be performed during step 390. The new parity information is then stored within the write-back cache unit 213 during step 392, and a disk write signal is generated during step 394 to write the sector of new data within write data buffer 234 into the corresponding data drive 214-x. The old data in the old data buffer 236 is discarded during step 396 and the address tags of the write-through cache unit 214-x are updated to reflect the new data written to the data disk 214-x. Finally, during step 398, the sector address of the new parity information update within write-back cache unit 213 is stored within non-volatile memory unit 216 to identify that the parity data stored at that address is dirty.

A variety of specific hardware configurations could be employed in association with a disk array subsystem according to the present invention. For example, FIG. 4 illustrates one such hardware configuration.

Figure 4:
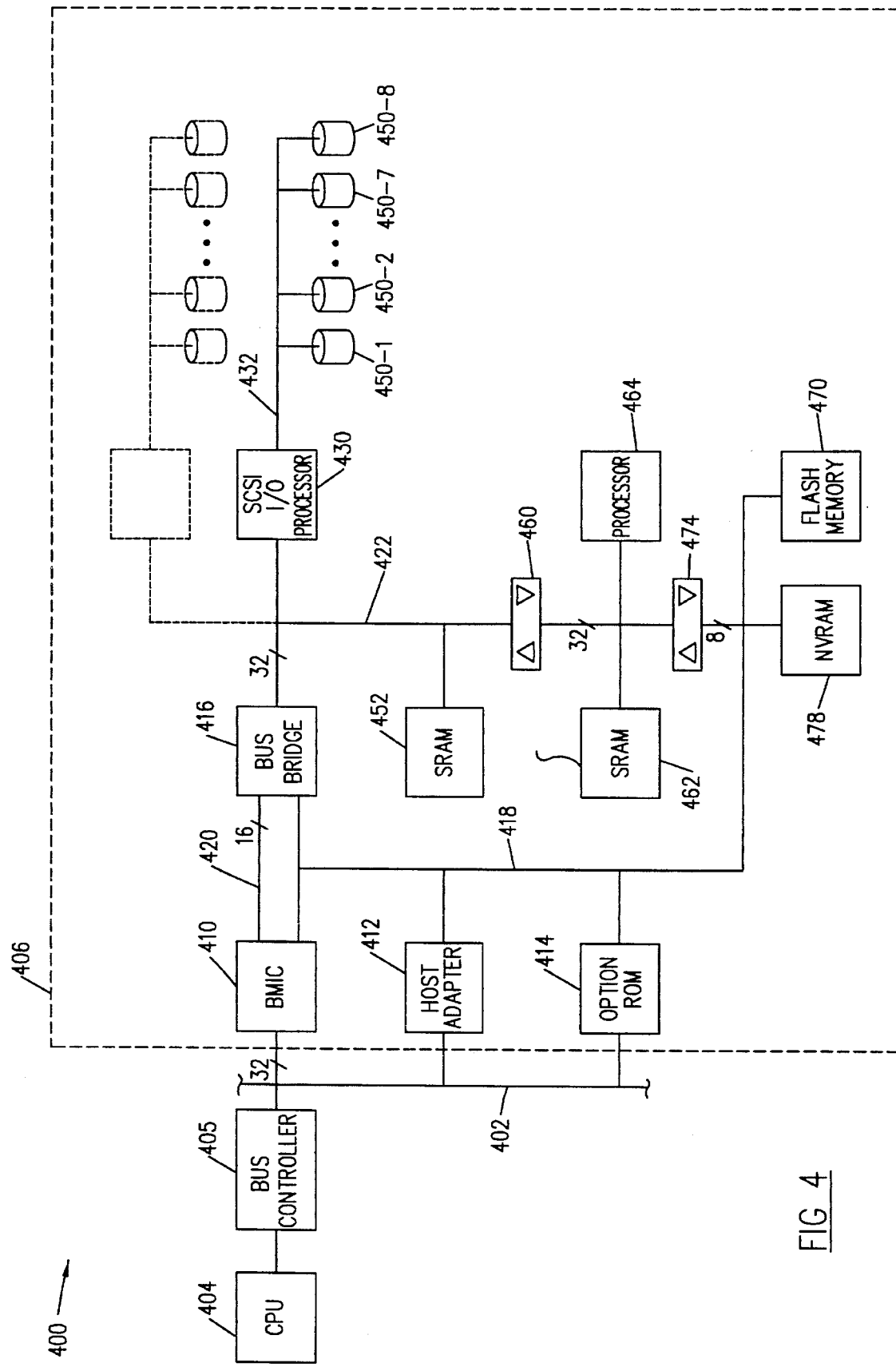
FIG. 4 is a hardware block diagram of a computer system including a disk array subsystem according to the present invention.

FIG. 4 is a block diagram of a computer system 400 including a peripheral bus 402 for bi-directional exchanges of data between various components of the computer system 400 such as a central processing unit (CPU) 404 and various peripheral devices associated with peripheral bus 402. CPU 404 is coupled to peripheral bus 402 through a bus controller 405. Preferably, peripheral bus 402 is a 32-bit extended industry standard architecture (or "EISA") type peripheral bus.

A circuit block 406 illustrates the hardware incorporated the disk array subsystem. A bus master interface chip (BMIC) 410, a host adapter chip 412, and an 8-bit option ROM 414 are shown connected to peripheral bus 402. The bus master interface chip 410 may be, for example, an 82355 BMIC manufactured by Intel Corporation of Santa Clara, Calif. The host adapter chip 412 may emulate, for example, an AHA-154X intelligent host adapter manufactured by Adaptec, Inc. The BMIC 410 is a 32-bit EISA bus master and I/O slave for transferring data and address signals between the peripheral bus 402 and a 16-bit bus bridge 416 of the disk array subsystem. Similarly, host adapter 412 is an 8-bit ISA I/O slave for transferring data and address signals between the peripheral bus 402 and an 8-bit extension bus 418. The 8-bit option ROM 414 contains the basic input output system (or "BIOS") for the disk array subsystem and, upon boot, provides configuration data to a system memory (not shown) that is required by CPU 404 to initialize the disk array subsystem. It is noted that operational details of BMIC 410 and host adapter 412 are well known to those skilled in the art.

Bus bridge 416 interfaces between a 16-bit internal bus 420 and a 32-bit internal bus 422. Bus bridge 416 includes several first-in first-out (or "FIFO") registers that are used to buffer data between the 16-bit bus 420 and the 32-bit bus 422. An additional FIFO register is also incorporated within bus bridge 416 to buffer the addresses of the data being transferred.

A SCSI ("Small Computer System Interface") I/O processor 430 is shown connected to bus 422 to provide a SCSI interface channel between bus 422 and a SCSI bus 432. SCSI I/O processor 430 may be, for example, a type 53C710 processor manufactured by NCR. SCSI processor 430 controls the bi-directional transfer of data to or from a corresponding auxiliary memory storage system such as, for example, a set of SCSI-type disk drives 450-1 through 450-8. Data stored within disk drives 450-x may be transferred by the SCSI I/O processor 430 to a static random access memory unit 452. From memory unit 452, data transfers to peripheral bus 402 are controlled by the BMIC 410. The SCSI I/O processor 430 may also fetch data or instructions from the memory unit 452 for transfer to the disk drives 450-x. It should be noted that while FIG. 4 illustrates a single SCSI channel residing on bus 422, it is specifically contemplated that any number of additional SCSI channels, one of which is illustrated in phantom in FIG. 4, may reside on bus 422.

A bus bridge 460 provides an interface between the bus 422 and a 32-bit local bus 462. The local bus 462 is controlled by a processor 464 which, for example, may be a 80960CA processor manufactured by Intel Corporation. The processor 464 executes code pertaining to the invention to effectuate various functions of array controller 210, cache units 212-x and 213, and parity control unit 220 as described previously with reference to FIGS. 2A–2C. It is noted that the source code of the present invention is stored with a flash memory 470 and is transferred into an SRAM memory unit 472 upon system initialization. Processor 464 executes the code out of memory unit 472.

A bus bridge 474 provides an interface between the local bus 462 and bus 418 to permit processor 464 to communicate the devices coupled to bus 418, such as flash memory unit 470. Also residing on bus 418 is an 8 Kb non-volatile memory (NVRAM) unit 478 which corresponds to the non-volatile memory unit 216 of FIG. 2. Physically, NVRAM unit 478 is an 8 Kbyte random access memory with a battery back-up power supply.

It is noted that in the embodiment of FIG. 4, SRAM memory unit 452 is segregated via software (that is executed by processor 464) to form a set of memory regions that form the cache memories of the cache units 212-x and 213 (shown in FIG. 2). The control of these respective cache memories is also managed by the software executing within processor 464.

Additional details regarding the exemplary hardware configuration of FIG. 4 are described within the commonly assigned, co-pending applications entitled "Method for Configuring a Composite Drive for a Disk Drive Array Controller", filed Sep. 30, 1993; "Multiple Function Interface Device for Option Card", Ser. No. 08/092,044, filed Jul. 15, 1993; "DMA Controller Having Address Generation Circuitry for Performing Memory Allocation and a Computer System Incorporating the Same", filed Oct. 6, 1993; "Multi-Purpose Usage of Transaction Backoff and Bus Architecture Supporting, Same", Ser. No. 08/104,225, filed Aug. 10, 1993; and System and Method for Controlling an EISA Bus Interface Signal in a Personal Computer, Ser. No. 08/102,449, filed Aug. 5, 1993. These applications are incorporated herein by reference in their entirety.

Numerous variations and modifications will become apparent to those skilled in the art once the above disclosure is fully appreciated. For example, while the source code of the present invention and the hardware configuration of FIG. 4 illustrate one exemplary embodiment of a disk array subsystem according to the present invention, a variety of other specific hardware configurations and/or software programs could be used to implement the present invention. Furthermore, although the functional embodiment of FIG. 2 is illustrated with a plurality of write-through cache unit for caching read data, the write-through cache units 212-x could be omitted. In such an embodiment, array scheduler 210 would read data directly from disk drives 214-1 through 214-7. It is intended that the following claims be interpreted to embrace all such variations and modifications.

What is claimed is:

1. A disk array subsystem for connection to a peripheral bus of a computer system comprising:

a plurality of disk drives coupled in parallel;

an array scheduler configured to receive a new write data sector and a composite write request signal from said peripheral bus and to determine a physical location within one of said plurality of disk drives which is addressed by said composite write request signal, and wherein said array scheduler is configured to generate a disk write request signal that causes said new write data sector to be written into said physical location of said one of said plurality of disk drives;

a parity control unit configured to read an old data sector from said physical location within said one of said disk drives before said new write data sector is written into said physical location, wherein said parity control unit is further configured to calculate a sector of new parity information based upon an exclusive-OR relationship of said new write data sector, said old data sector and a sector of old parity information;

a write-through cache unit coupled to receive said new write data sector and said disk write request signal, wherein said write-through cache unit is configured to control a storage and retrieval of said new write data sector to and from said one of said plurality of disk drives; and a write-back cache unit coupled to a second of said plurality of disk drives for storing said sector of new parity information;

whereby a write-through caching policy is employed to store said new write data sector and a write-back caching policy is employed to store said sector of new parity information.

2. The disk array subsystem as recited in claim 1 wherein said second of said plurality of disk drives coupled to said write-back cache unit is a parity drive for storing parity information indicative of data stored within a remainder of said plurality of disk drives.

3. The disk array subsystem as recited in claim 1 wherein a non-volatile memory unit is coupled to said write-back cache unit for storing an address of dirty parity information.

4. The disk array subsystem as recited in claim 1 wherein said second of said plurality of disk drives is a parity drive for storing parity information and wherein a remainder of said plurality of disk drives are data drives for storing system data.

5. The disk array subsystem as recited in claim 4 wherein a dedicated write-through cache unit is coupled to each of said data drives.

6. The disk array subsystem as recited in claim 1 wherein said sector of old parity information is read by said parity control unit from said second of said plurality of disk drives.

7. The disk array subsystem as recited in claim 1 wherein each of said plurality of disk drives is a SCSI drive.

8. A disk array subsystem for connection to a peripheral bus of a computer system and to a plurality of disk drives, said disk array subsystem comprising:

a write-back cache unit for connection to one of said plurality of disk drives for storing parity information;

a write-through cache unit for connection to at least a second of said plurality of disk drives for storing data, wherein said parity information is indicative of said data;

a parity control unit coupled to said write-back cache unit, wherein said parity control unit is configured to calculate said parity information in response to an operation to write said data to said second of said plurality of disk drives; and an array scheduler coupled to said write-through cache unit and to said write-back cache unit, wherein said array scheduler is configured to receive a write request signal from said peripheral bus and to determine a physical location within said second of said plurality of disk drives which is addressed by said write request signal;

whereby a write-through caching policy is implemented to store said data and a write-back caching policy is implemented to store said parity information indicative of said data.

9. The disk array subsystem as recited in claim 8 wherein said array scheduler is configured to cause said parity information to be stored within said write-back cache unit.

10. The disk array subsystem as recited in claim 9 further comprising a non-volatile memory unit coupled to said write-back cache unit for storing an address of said parity information.

11. The disk array subsystem as recited in claim 8 wherein said write-back cache unit implements a write-back caching algorithm for transferring said parity information into and out of said one of said plurality of disk drives.

12. A method for controlling a transfer and storage of data within a disk array subsystem comprising the steps of:

storing real data within sectors of a plurality of disk drives;

storing parity data indicative of said real data within a sector of an additional disk drive;

receiving a write request signal to store a new sector of write data within a predetermined location of one of said plurality of disk drives;

storing said new sector of write data within a first memory buffer;

transferring an old sector of data from said predetermined location of said one of said plurality of disk drives to a second memory buffer;

retrieving a sector of parity information from said additional disk drive;

calculating an updated sector of parity information;

storing said new sector of write data into said predetermined location of said one of said plurality of disk drives; and storing said updated sector of parity information into a write-back cache memory unit.

13. The method as recited in claim 12 comprising a further step of storing an address of the updated sector of parity information into a non-volatile memory unit.

14. The method as recited in claim 12 wherein the step of calculating an updated sector of parity information includes the steps of:

performing an exclusive-OR operation on said new sector of write data and said old sector of data to obtain an intermediate value; and performing another exclusive-OR operation on the intermediate value and said sector of parity information.

15. The method as recited in claim 12 wherein the step of retrieving a sector of parity information includes the step of storing said sector of parity information into a third memory buffer.

* * * * *